(12) United States Patent
Oh et al.

(10) Patent No.: US 8,170,503 B2
(45) Date of Patent: May 1, 2012

(54) APPARATUS AND METHOD FOR TRANSMITTING DATA AND APPARATUS AND METHOD FOR RECEIVING DATA

(75) Inventors: Ji-Sung Oh, Seongnam-si (KR); Seong-Soo Kim, Seoul (KR); Chang-Yeul Kwon, Yongin-si (KR); Jae-Hwa Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 921 days.

(21) Appl. No.: 12/103,935

(22) Filed: Apr. 16, 2008

(65) Prior Publication Data

US 2008/0254752 A1 Oct. 16, 2008

Related U.S. Application Data

(60) Provisional application No. 60/907,752, filed on Apr. 16, 2007.

(30) Foreign Application Priority Data

Oct. 17, 2007 (KR) ........................ 10-2007-0104609

(51) Int. Cl.
*H04B 1/04* (2006.01)
(52) U.S. Cl. ...... 455/103; 455/129; 455/272; 455/276.1
(58) Field of Classification Search ................. 455/103, 455/129, 272, 273, 275, 276.1; 342/377; 370/335
See application file for complete search history.

(56) References Cited

U.S. PATENT DOCUMENTS 7,710,319 B2 * 5/2010 Nassiri-Toussi et al. ..... 342/377
* cited by examiner

*Primary Examiner* — Christian Hannon
(74) *Attorney, Agent, or Firm* — Sughrue Mion, PLLC

(57) ABSTRACT

Provided are an apparatus and method for transmitting data and an apparatus and method for receiving data, in which beam forming is performed in consideration of the communication capabilities of antennas of stations that perform directional communication in a high-frequency band. The apparatus for transmitting data includes a communication-capability-determination module which determines the communication capability of a receiver (RX) antenna module of a receiving station based on communication-capability data transmitted by the receiving station; an antenna-control module which controls a transmitter (TX) antenna module according to a beam-forming mode determined based on the communication capability of the RX antenna module and the communication capability of the TX antenna module; and a communication module which transmits data through the TX antenna module, wherein the beam-forming mode determines whether to transmit a TX antenna weight vector (AWV) pattern, whether to receive a feedback response pattern and whether to transmit an RX AWV pattern.

24 Claims, 9 Drawing Sheets

FIG. 6

| RX \ TX | SINGLE ANTENNA | SWITCH ANTENNA | PHASED-ARRAY ANTENNA |
|---|---|---|---|
| SINGLE ANTENNA<br>AWV PATTERN<br>FEEDBACK RESPONSE PATTERN<br>RX OPERATION<br>PATTERN ITERATION | NONE<br>NONE<br>NONE<br>NONE | IDENTITY MATRIX<br>OPTIMUM TX ANTENNA<br>NONE<br>NONE | HADAMARD MATRIX<br>OPTIMUM TX AWV<br>NONE<br>NONE |
| SWITCH ANTENNA<br>AWV PATTERN<br>FEEDBACK RESPONSE PATTERN<br>RX OPERATION<br>PATTERN ITERATION | NONE<br>NONE<br>SELECT RX ANTENNA<br>NONE | IDENTITY MATRIX<br>OPTIMUM TX ANTENNA<br>SELECT RX ANTENNA<br>REPEAT | HADAMARD MATRIX<br>OPTIMUM TX AWV<br>SELECT RX ANTENNA<br>REPEAT |
| PHASED-ARRAY ANTENNA<br>AWV PATTERN<br>FEEDBACK RESPONSE PATTERN<br>RX OPERATION<br>PATTERN ITERATION | NONE<br>NONE<br>CALCULATE RX AWV<br>NONE | IDENTITY MATRIX<br>OPTIMUM TX ANTENNA<br>CALCULATE RX AWV<br>REPEAT | HADAMARD MATRIX<br>OPTIMUM TX AWV<br>CALCULATE RX AWV<br>REPEAT |

600

APPARATUS AND METHOD FOR TRANSMITTING DATA AND APPARATUS AND METHOD FOR RECEIVING DATA

CROSS-REFERENCE TO RELATED APPLICATION

This application claims priority from U.S. Provisional Application No. 60/907,752 filed on Apr. 16, 2007, and Korean Patent Application No. 10-2007-0104609 filed on Oct. 17, 2007 in the Korean Intellectual Property Office, the disclosures of which are incorporated herein by reference in their entirety.

BACKGROUND OF THE INVENTION

1. Field of the Invention

Apparatuses and methods consistent with the present invention relate to transmitting and receiving data, and, more particularly, to transmitting and receiving data, in which beam forming is performed in consideration of the communication capabilities of antennas of stations that perform directional communication in a high-frequency band.

2. Description of the Related Art

As networks become wireless and the demand for large multimedia data transmission increases, there is a need for studies on an effective transmission method in a wireless network environment. In particular, the demand for various home devices that wirelessly transmit high-quality video, such as digital video disk (DVD) images or high definition television (HDTV) images, is growing.

The IEEE 802.15.3c task group is developing a technological standard for transmitting large-volume data over a wireless home network. The technological standard, which is called "millimeter wave" (mmWave), uses an electromagnetic wave having a physical wavelength of a millimeter (i.e., an electromagnetic wave having a frequency band of 30-300 GHz) to transmit large-volume data. This frequency band, which is an unlicensed band, has conventionally been used by communication service providers or used for limited purposes, such as observing electromagnetic waves or preventing vehicle collision.

FIG. 1 illustrates a diagram for comparing the frequency bands of the IEEE 802.11 series of standards and mmWave. Referring to FIG. 1, the IEEE 802.11b or IEEE 802.11g standard uses a carrier frequency of 2.4 GHz and has a channel bandwidth of approximately 20 MHz. In addition, the IEEE 802.11a or IEEE 802.11n standard uses a carrier frequency of 5 GHz and has a channel bandwidth of approximately 20 MHz. In contrast, mmWave uses a carrier frequency of 60 GHz and has a channel bandwidth of approximately 0.5-2.5 GHz. Therefore, it can be understood that mmWave has a far greater carrier frequency and channel bandwidth than the related art IEEE 802.11 series of standards. When a high-frequency signal (mmWave) having a millimeter wavelength is used, a very high transmission rate of several Gbps can be achieved. Since the size of an antenna can also be reduced to less than 1.5 mm, a single chip which includes the antenna can be implemented. Furthermore, interference between devices can be reduced due to a very high attenuation ratio of the high-frequency signal in air.

A method of transmitting uncompressed audio or video data (hereinafter, referred to as uncompressed audio/video (AV) data) between wireless devices using a high bandwidth of a millimeter wave has recently been studied. Compressed AV data is generated after lossy compression processes such as motion compensation, discrete cosine transform (DCT), quantization, and variable length coding (VLC) processes. In so doing, components of compressed AV data that human visual and auditory senses are less sensitive to are removed. In contrast, uncompressed AV data includes digital values indicating pixel components (for example, red (R), green (G) and blue (B) components).

Stations that transmit/receive data in such a network environment are generally equipped with antennas. A transmitting station may have a different antenna from that of a receiving station. For example, a transmitting station may be equipped with a phased-array antenna, and a receiving station may be equipped with a single antenna. In this case, even if the transmitting station attempts to perform beam forming through the exchange of an antenna weight vector (AWV), the receiving station may not be able to respond to the transmitting station, and, thus, the beam-forming operation may not be properly performed.

Therefore, it is necessary to develop a technique of effectively performing beam forming even when a transmitting station and a receiving station have different types of antennas.

SUMMARY OF THE INVENTION

The present invention provides performing beam forming in consideration of the communication capabilities of antennas of stations that perform directional communication in a high-frequency band.

However, the objectives of the present invention are not restricted to the ones set forth herein. The above and other objectives of the present invention will become apparent to one of daily skill in the art to which the present invention pertains by referencing the detailed description of the present invention given below.

According to an aspect of the present invention, there is provided an apparatus for transmitting data, which uses a mmWave channel, the apparatus including a communication-capability-determination module which determines the communication capability of a receiver (RX) antenna module of a receiving station based on communication-capability data transmitted by the receiving station; an antenna-control module which controls a transmitter (TX) antenna module according to a beam-forming mode determined based on the communication capability of the RX antenna module and the communication capability of the TX antenna module; and a communication module which transmits data through the TX antenna module, wherein the beam-forming mode determines whether to transmit a TX antenna weight vector (AWV) pattern, whether to receive a feedback response pattern and whether to transmit an RX AWV pattern.

According to another aspect of the present invention, there is provided an apparatus for receiving data, which uses a mmWave channel, the apparatus including a communication-capability-determination module which determines the communication capability of a TX antenna module of a transmitting station based on communication-capability data transmitted by the transmitting station; an antenna-control module which controls an RX antenna module according to a beam-forming mode determined based on the communication capability of the TX antenna module and the communication capability of the RX antenna module; and a communication module which receives data through the RX antenna module, wherein the beam-forming mode determines whether to receive a TX AWV pattern, whether to transmit a feedback response pattern and whether to receive an RX AWV pattern.

According to another aspect of the present invention, there is provided a method of transmitting data, in which a mmWave channel is used, the method including determining the communication capability of an RX antenna module of a receiving station based on communication-capability data transmitted by the receiving station; controlling a TX antenna module according to a beam-forming mode determined based on the communication capability of the RX antenna module and the communication capability of the TX antenna module; and transmitting data through the TX antenna module, wherein the beam-forming mode determines whether to transmit a TX AWV pattern, whether to receive a feedback response pattern and whether to transmit an RX AWV pattern.

According to another aspect of the present invention, there is provided a method of receiving data, in which a mmWave channel is used, the method including determining the communication capability of a TX antenna module of a transmitting station based on communication-capability data transmitted by the transmitting station; controlling an RX antenna module according to a beam-forming mode determined based on the communication capability of the TX antenna module and the communication capability of the RX antenna module; and receiving data through the RX antenna module, wherein the beam-forming mode determines whether to receive a TX AWV pattern, whether to transmit a feedback response pattern and whether to receive an RX AWV pattern.

BRIEF DESCRIPTION OF THE DRAWINGS

The above and other aspects of the present invention will become apparent by describing in detail exemplary embodiments thereof with reference to the attached drawings in which:

FIG. 6 illustrates a table of various beam-forming modes for combinations of various types of TX and RX antennas;

DETAILED DESCRIPTION OF EXEMPLARY EMBODIMENTS OF THE INVENTION

Figure 1:
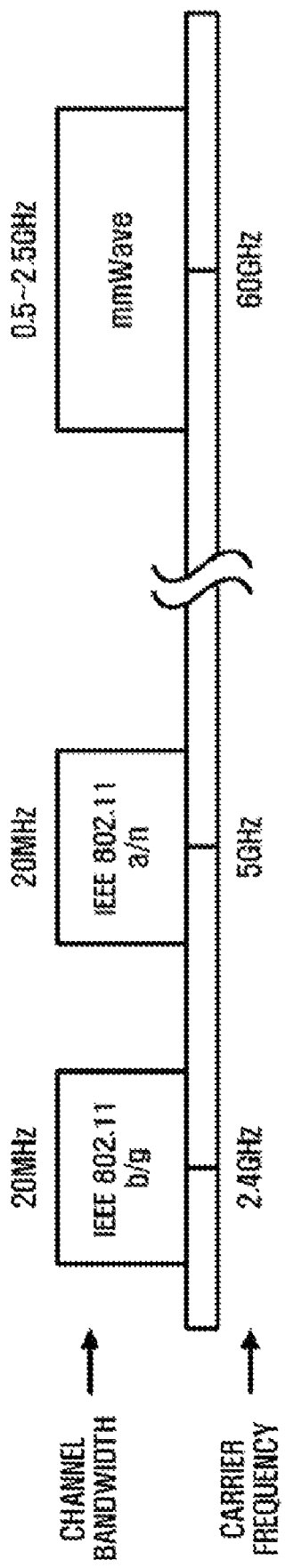
FIG. 1 illustrates a diagram for comparing frequency bands of the IEEE 802.11 series of standards and the mmWave standard.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 2:
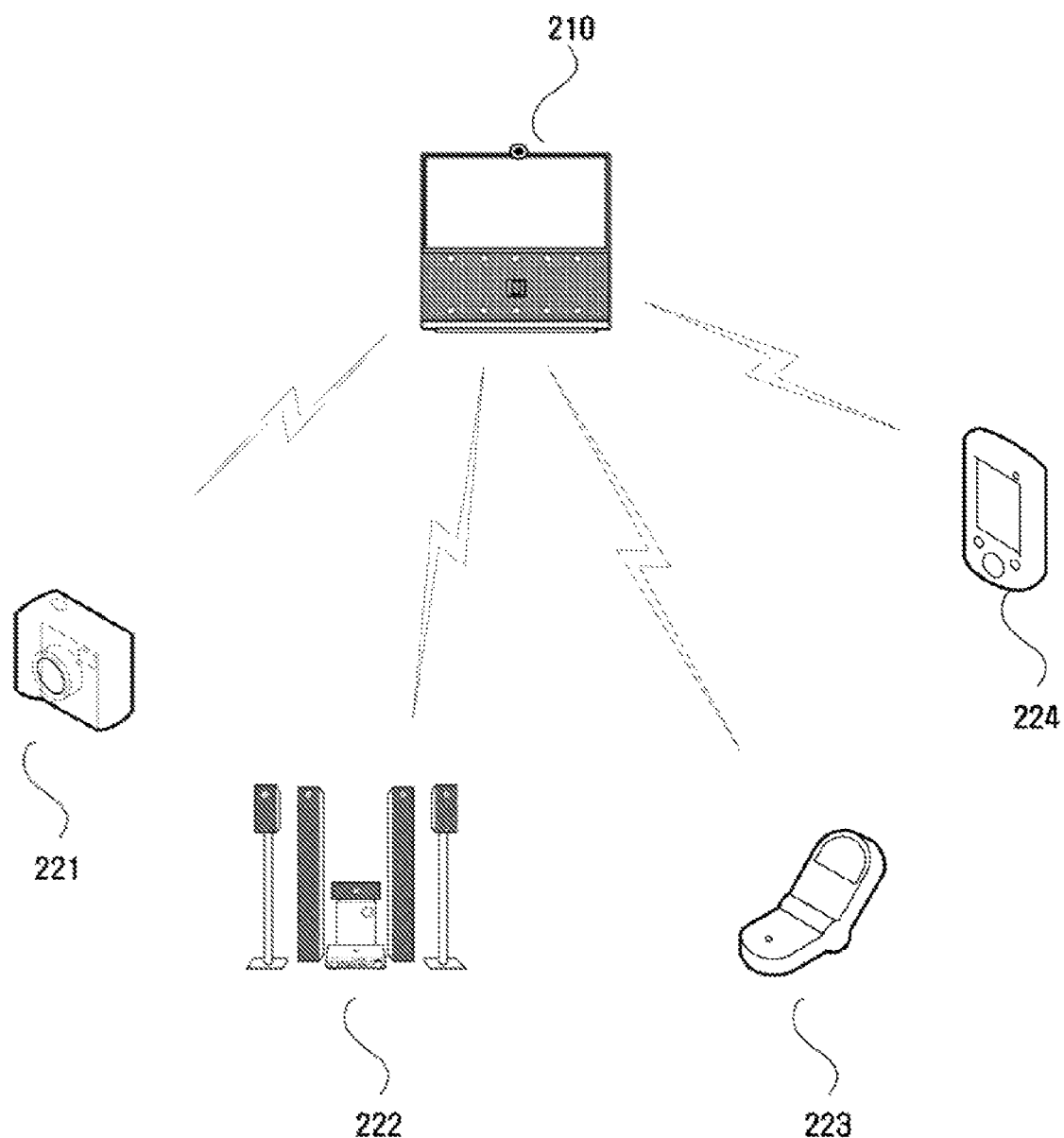
FIG. 2 illustrates a schematic diagram of a wireless network system according to an exemplary embodiment of the present invention.

FIG. 2 illustrates a schematic diagram of a wireless network system according to an exemplary embodiment of the present invention. Referring to FIG. 2, the wireless network system includes a wireless network coordinator 210 and a plurality of stations 221 through 224.

The wireless network coordinator 210 coordinates bandwidth allocation for the stations 221 through 224 by transmitting a beacon frame. That is, the stations 221 through 224 may receive a beacon frame and wait for a band to be allocated thereto with reference to the received beacon frame. If a band is allocated, the stations 221 through 224 may be able to transmit data to other stations through the band.

A network may be configured using a super frame including one or more channel time blocks. A channel time block may be classified into either a reserved channel time block which is a reserved time period for allocating a band to a certain station in a network or an unreserved channel time block which is a time period for allocating a band to a station that wins the competition with other stations in a network. A channel time block is a time period during which data is transmitted between stations in a network, and may correspond to a channel time allocation period and a contention access period.

In order to transmit data, a station may compete with other stations during an unreserved channel time block. Alternatively, a station may transmit data during a reserved channel time block allocated thereto.

According to mmWave technology, in which a carrier frequency of 60 GHz is used and data is transmitted using a channel bandwidth of 0.5-2.5 GHz, it is sometimes required to perform directional communication. That is, data communication may need to be performed by arranging an antenna of a transmitting station and an antenna of a receiving station to face each other. Therefore, beam forming may be performed in order to synchronize the direction of radio waves transmitted by a transmitting station with the direction of radio waves transmitted by a receiving station.

Beam forming may be interpreted as an operation of synchronizing the direction of an antenna of a transmitting station with the direction of an antenna of a receiving station.

A station may be equipped with a single antenna, a switch antenna including more than one antenna or a phased-array antenna including more than one antenna capable of adjusting phase.

A single antenna is an antenna having directivity. The direction of a single antenna cannot be altered.

A switch antenna includes a plurality of antennas having directivity. The directions of antennas of a switch antenna cannot be altered. However, the directions of antennas of a switch antenna may be set to be different from one another, and data may be transmitted only through one selected from the antennas. In this manner, the direction of radio waves transmitted by a switch antenna may be adjusted.

A phased-array antenna, like a switch antenna, includes a plurality of antenna having directivity. The direction of radio waves transmitted by a phased-array antenna may be adjusted by adjusting the phases of antennas of the phased-array antenna.

In order to transmit/receive data in a high-frequency band, phased-array antenna beam forming, which a type of beam forming that can be performed between phased-array antennas, may be performed. Phased-array antenna beam forming, however, involves relatively complicated processes.

If one of a transmitting station and a receiving station is equipped with a phased-array antenna and the other station is equipped with a single antenna, phased-array antenna beam forming may be unnecessary.

Therefore, the communication capabilities of a transmitting station and a receiving station may be determined first, and beam forming may be performed in consideration of the communication capabilities of the transmitting station and the receiving station.

Figure 3:
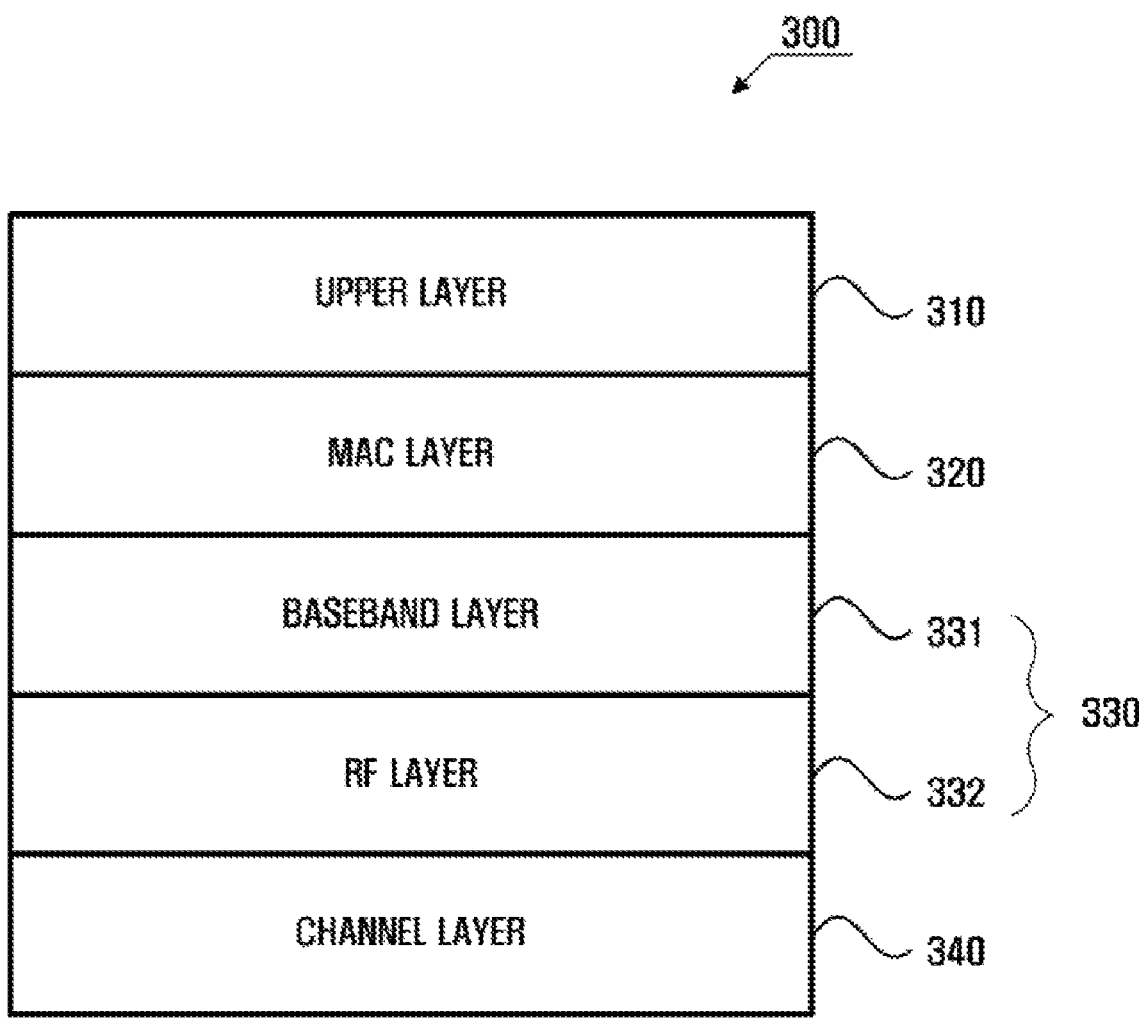
FIG. 3 illustrates a diagram of the structure of a communication layer according to an exemplary embodiment of the present invention.

FIG. 3 illustrates a diagram of the structure of a communication layer 300 according to an exemplary embodiment of the present invention. Referring to FIG. 3, the communication layer 300 includes a channel layer 340 which is a physical medium having a frequency band through which wireless signals are transmitted; a physical (PHY) layer 330 which includes a radio frequency (RF) layer 332 and a baseband layer 331; a media access control (MAC) layer 320; and an upper layer 310. The upper layer 310, which is a layer above the MAC layer 320, may include a logical link control (LLC) layer, a network layer, a transmission layer and an application layer.

A wireless channel be a high-frequency band of, for example, 60 GHz, or a low-frequency band of, for example, 2.4 GHz or 5 GHz. Accordingly, the channel layer 340 may enable not only communication with directivity such as uni-directional communication but also communication with no directivity such as omni-directional communication. Beam forming for omni-directional communication may be optional.

Figure 4:
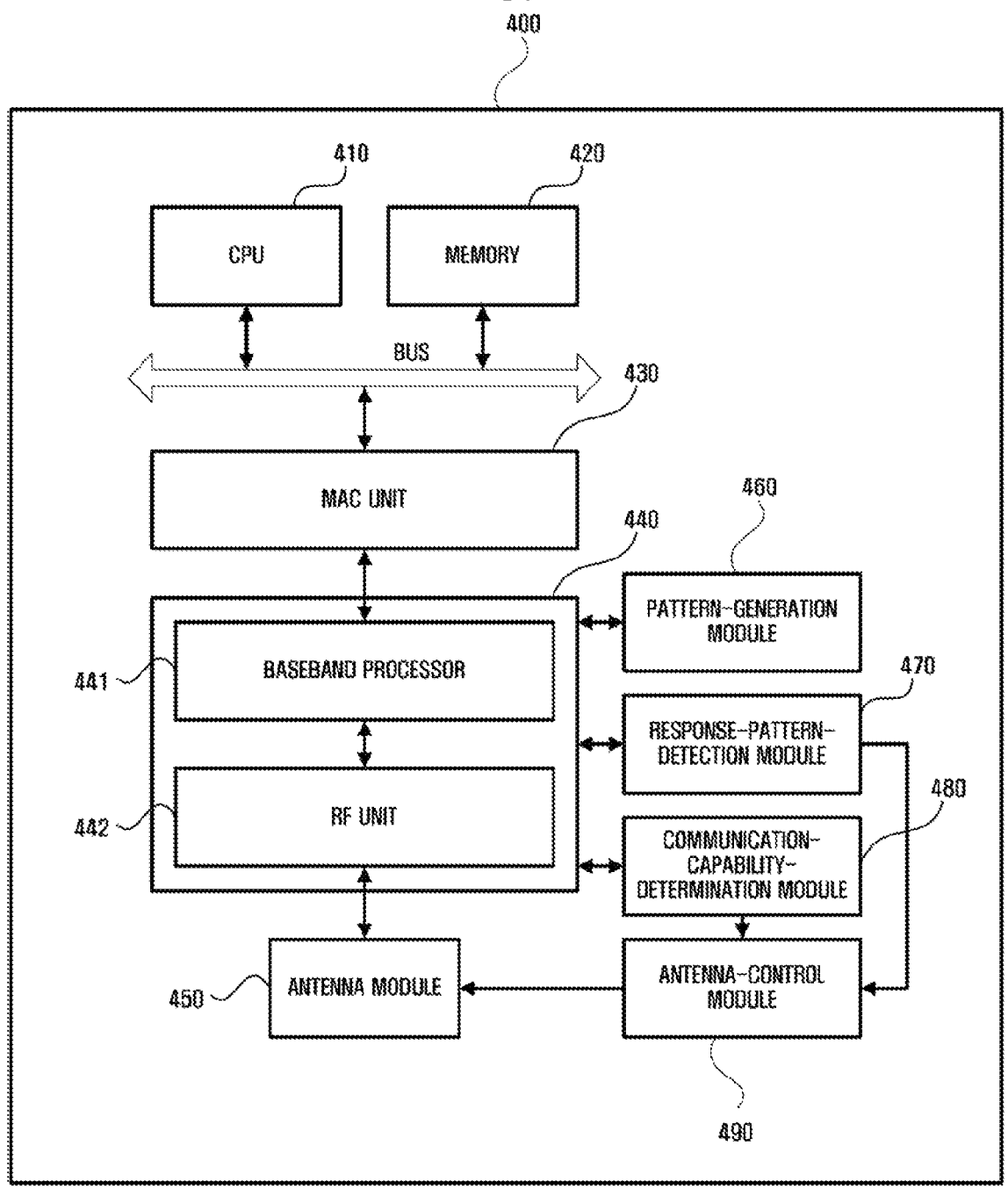
FIG. 4 illustrates a block diagram of an apparatus for transmitting data according to an exemplary embodiment of the present invention.

FIG. 4 illustrates a block diagram of an apparatus for transmitting data according to an exemplary embodiment of the present invention, i.e., a transmitting station 500. Referring to FIG. 4, the transmitting station 400 includes a central processing unit (CPU) 410, a memory 420, an MAC unit 430, a communication module 440, an antenna module (hereinafter referred to as the transmitter (TX) antenna module) 450, a pattern-generation module 460, a response-pattern-detection module 470, a communication-capability-determination module 480, and an antenna-control module 490.

The CPU 410 controls various elements of the transmitting station 400 which are all connected to a bus. The CPU 410 performs operations of the upper layer 310. Specifically, the CPU 410 may received data (i.e., a received MAC service data unit (MSDU)) provided by the MAC unit 430. In addition, the CPU 410 generates data to be transmitted (i.e., an MSDU to be transmitted) and provides the generated data to the MAC unit 430.

The memory 420 stores data. The memory 420 may be a module such as a hard disc, a flash memory, a Compact Flash (CF) card, a Secure Digital (SD) card, a Smart Media (SM) card, a MultiMedia Card (MMC) card or a memory stick to/from which data can be input/output. The memory 420 may be included in the transmitting station 400 or in an external apparatus.

The MAC unit 430 receives an MSDU to be transmitted from the CPU 410 and adds an MAC header to the MSDU to be transmitted, thereby generating an MAC protocol data unit (MPDU). The communication module 440 converts the MPDU generated by the MAC unit 430 into a wireless signal and transmits the wireless signal through a communication channel. For this, the communication module 440 may include a baseband processor 441 and an RF unit 442 and may be connected to the TX antenna module 450. The antenna module 450 may include one or more antennas such as a single antenna, a switch antenna or a phased-array antenna.

The baseband processor 441 adds a signal field and a pre-amble to the MPDU generated by the MAC unit 430, thereby generating a PHY protocol data unit (PPDU). Then, the RF unit 442 converts the PPDU generated by the baseband processor 441 into a wireless signal and transmits the wireless signal through the TX antenna module 450.

The communication-capability-determination module 480 determines the communication capability of an antenna of a station, which engages in communication with the transmitting station 400, based on communication-capability data transmitted by the station. That is, the communication-capability-determination module 480 determines the communication capability of an antenna module (hereinafter referred to as the receiver (RX) antenna module) 550 of a receiving station 500.

Before performing beam forming, the transmitting station 400 and the receiving station 500 exchange communication-capability data with each other through the communication module 440 of the transmitting station 400 and a communication module 540 of the receiving station 500. The communication-capability data may specify the communication capability of the RX antenna module 550 and include the type of the RX antenna module 550 and the number of antennas included in the RX antenna module 550.

The antenna-control module 490 controls the TX antenna module 450 according to a beam-forming mode determined based on the communication capabilities of the TX antenna module 450 and the RX antenna module 550.

A total of nine beam-forming modes may be provided according to the type of the TX antenna module 450 and the type of the RX antenna module 450, i.e., according to whether the TX antenna module 450 and the RX antenna module 450 are single antennas, switch antennas or phased-array antennas.

FIG. 6 illustrates a table 600 of various beam-forming modes for combinations of various types of TX antennas and RX antennas. The transmitting station 400 and the receiving station 500 may perform beam forming with reference to the table 600. For this, the table 600 may be stored in a memory 420 of the transmitting station 400 and a memory 520 of the receiving station 500.

The pattern-generation module 460 generates a transmitter antenna weight vector (TX AWV) pattern. A feedback response pattern may be received in response to the TX AWV pattern generated by the pattern-generation module 460. The received feedback response pattern may be analyzed by the response-pattern-detection module 470, and the antenna-control module 490 may control the TX antenna module 450 according to the results of the analysis. The TX AWV pattern generated by the pattern-generation module 460 may be transmitted to the receiving station 500 through the communication module 440. The TX AWV pattern generated by the pattern-generation module 460 may be an identity matrix or a Hadamard matrix according to the type of the TX antenna module 450.

Figure 7:
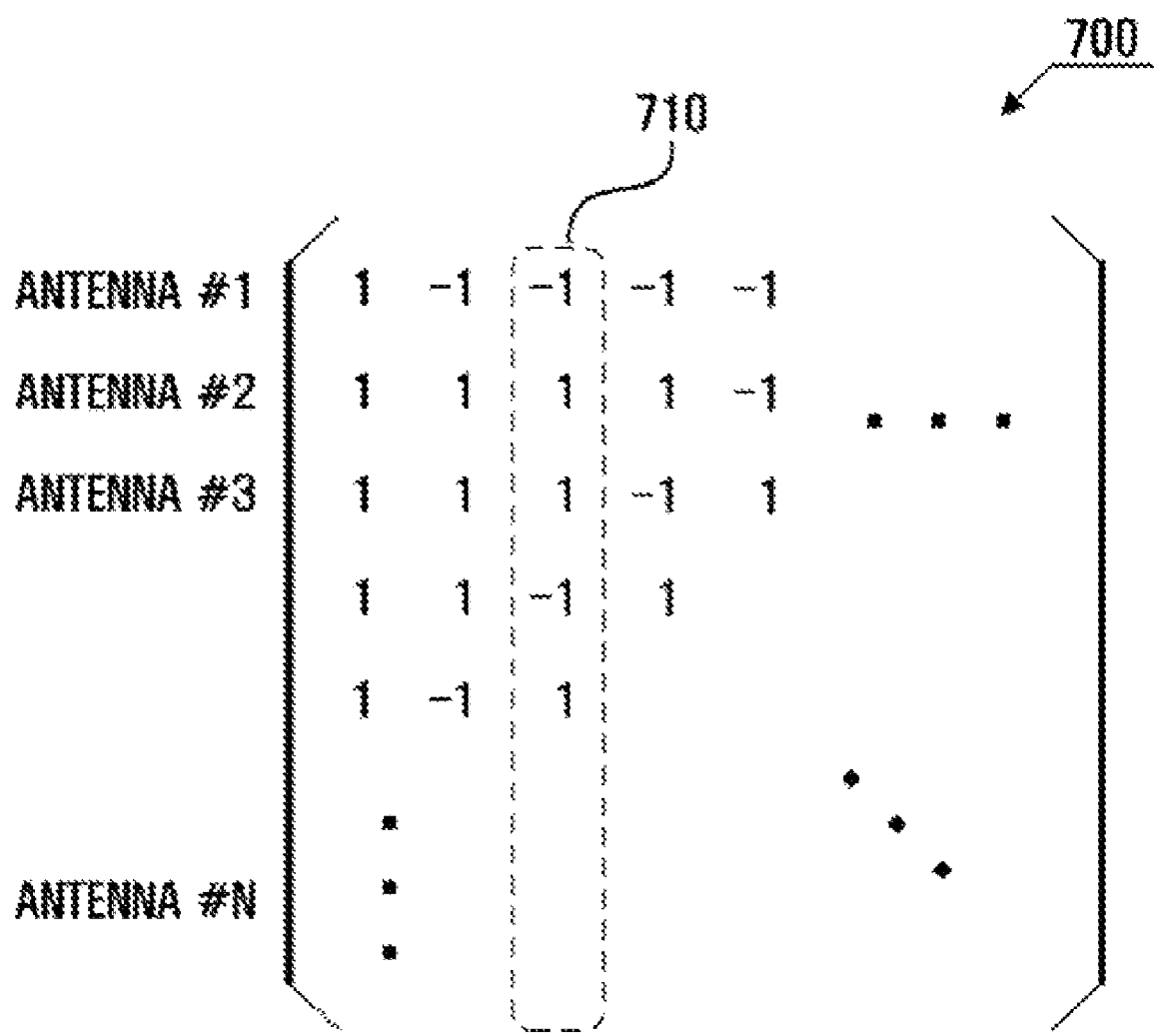
FIG. 7 illustrates a diagram of a TX AWV pattern according to an exemplary embodiment of the present invention.

FIG. 7 illustrates a diagram of a TX AWV pattern 700 according to an exemplary embodiment of the present invention. Referring to FIG. 7, the TX AWV pattern 700 is set so that the direction of a training signal allocated to each antenna can vary at each transmission. The pattern-generation module 460 may generate a TX AWV pattern slot 710 at each transmission. If the TX AWV pattern 700 is stored in the memory 420, the pattern-generation module 460 may extract a TX AWV pattern slot 710 from the TX AWV pattern 700 at each transmission.

The TX antenna module 450 and the RX antenna module 550 may include a single antenna, a switch antenna or a phased-array antenna. A TX AWV pattern is used to perform beam forming. If the TX antenna module 450 includes a single antenna, beam forming may not necessarily need to be performed. In this case, the pattern-generation module 460 may not necessarily need to generate a TX AWV pattern.

In contrast, if the TX antenna module 450 includes a switch antenna, the pattern-generation module 460 generates an identity matrix as a TX AWV pattern and selects one of a plurality of antennas included in the TX antenna module 450 with reference to a feedback response pattern, which is received in response to the TX AWV pattern. The feedback response pattern may specify which of the antennas in the TX antenna module 450 is expected to transmit data most smoothly, i.e., which of the antennas in the TX antenna module 450 is an optimum TX antenna. Thus, the antenna-control module 490 controls data to be transmitted through whichever of the antennas included in the TX antenna module 450 is an optimum TX antenna.

If the TX antenna module 450 includes a phased-array antenna, the pattern-generation module 460 generates a Hadamard matrix as a TX AWV pattern and adjusts the direction of the TX antenna module 450 with reference to a feedback response pattern, which is received in response to the TX AWV pattern. The feedback response pattern may indicate an antenna direction (hereinafter referred to as an optimum TX AWV) in which data is expected to be transmitted most smoothly. Thus, the antenna-control module 490 may adjust the direction of the TX antenna module 450 by altering the phase of the TX antenna module 450.

Figure 8:
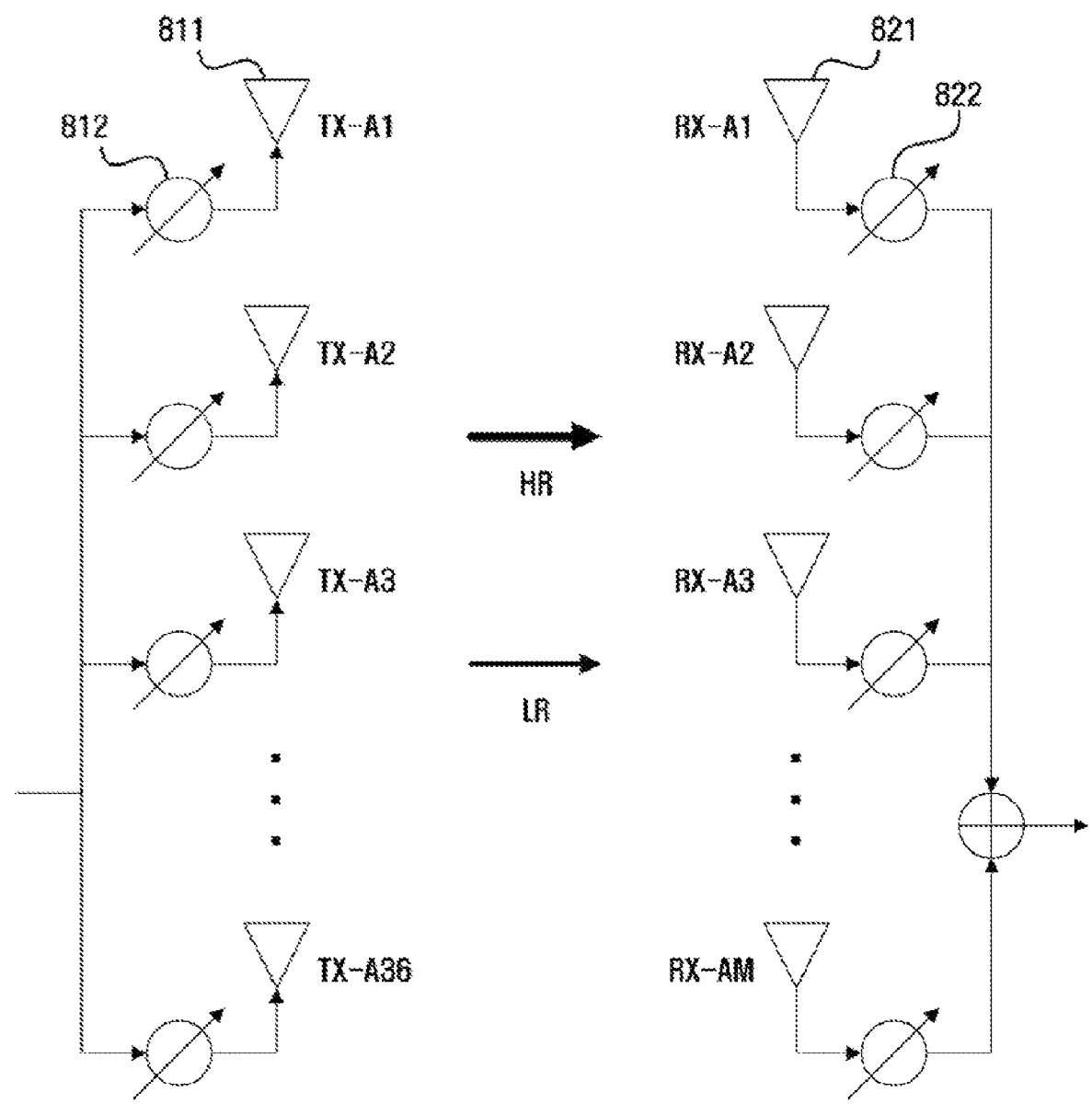
FIG. 8 illustrates a diagram of the communication between a transmitting station and a receiving station which are both equipped with a phased-array antenna, according to an exemplary embodiment of the present invention.

FIG. 8 illustrates a schematic diagram of the communication between the transmitting station 400 and the receiving station 500. Referring to FIG. 8, the TX antenna module 450 of the transmitting station 400 includes a plurality of antennas 811 and a plurality of phase adjustment modules 812 respectively corresponding to the antennas 811. Likewise, the RX antenna module 550 of the receiving station 500 includes a plurality of antennas 821 and a plurality of phase adjustment modules 822 respectively corresponding to the antennas 821. The antenna-control module 490 of the transmitting station 400 may alter the direction of the TX antenna module 450 by controlling the phase adjustment modules 812. Likewise, an antenna-control module 590 of the receiving station 500 may alter the direction of the RX antenna module 550 by controlling the phase adjustment modules 822.

In the high-frequency band of 60 GHz, data may be transmitted at a high rate (HR) through a phased-array antenna. In contrast, in a low-frequency band of 2.4 GHz or 5 GHz, data may be transmitted at a low rate (LR) through a phased-array antenna.

Figure 9:
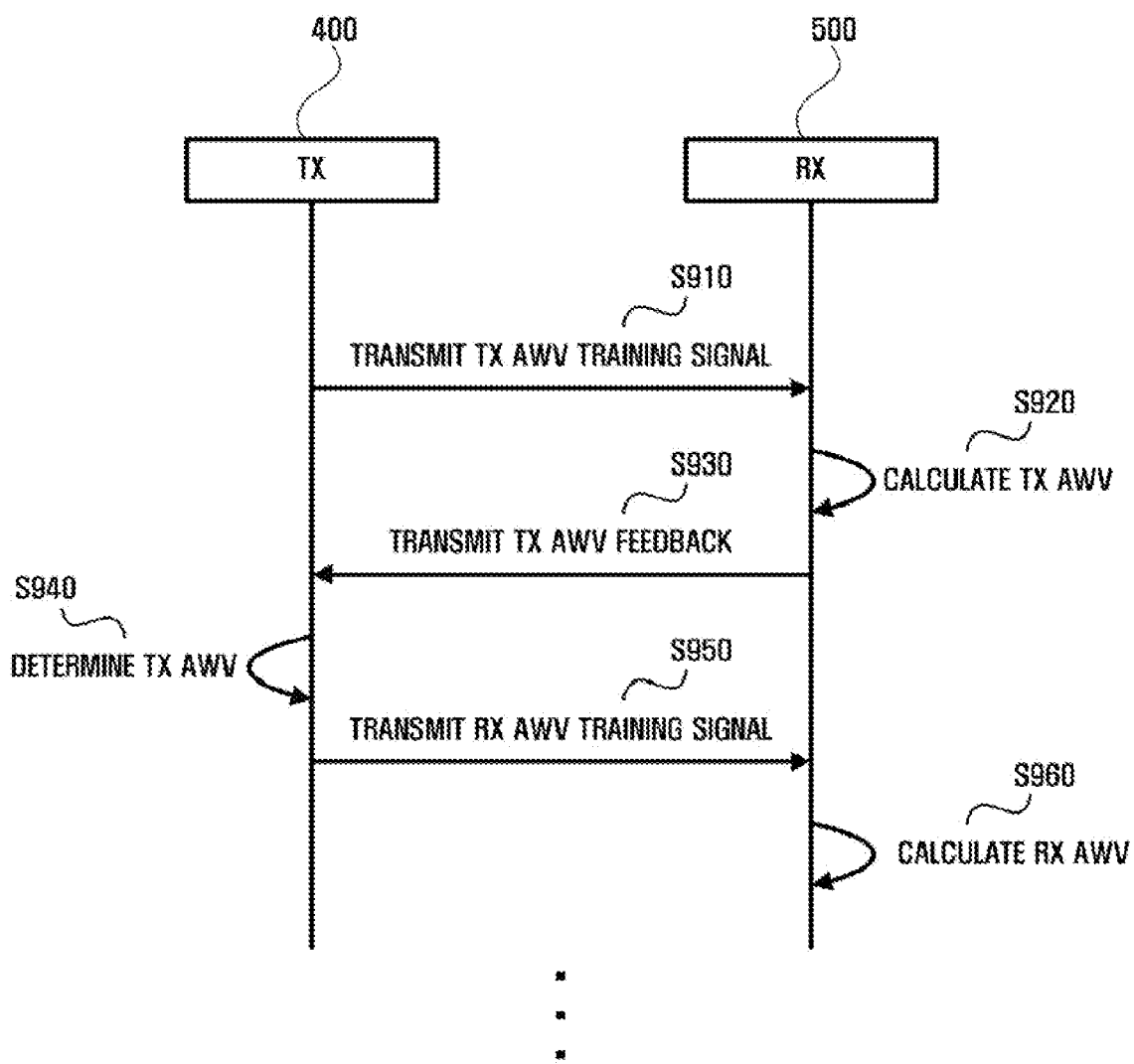
FIG. 9 illustrates a flowchart of phased-array antenna beam forming according to an exemplary embodiment of the present invention.

Phased-array antenna beam forming will hereinafter be described in detail with reference to FIG. 9. Referring to FIG. 9, the timing, delay, and frequency/phase offset of the transmitting station 400 are synchronized with the timing, delay, and frequency/phase offset of the receiving station 500. Thereafter, the transmitting station 400 transmits a TX AWV training signal to the receiving station 500 (S910).

Then, the receiving station 500 calculates an optimum TX AWV based on the TX AWV training signal (S920), inserts the optimum TX AWV in a feedback response pattern, and transmits the feedback response pattern to the transmitting station 400 (S930).

Thereafter, the transmitting station 400 determines the TX AWV (S940) and transmits an RX AWV training signal to the receiving station 500 (S950). Then, the receiving station 500 calculates an optimum RX AWV based on the RX AWV training signal (S960), and adjusts the direction of the RX antenna module 550.

Operations S910 through S960 may be repeatedly performed so that beam forming can be continuously performed between the transmitting station 400 and the receiving station 500.

Referring to FIG. 4, the pattern-generation module 460 generates an RX AWV pattern. The RX AWV pattern may be transmitted to the receiving station 500. The RX AWV pattern may be generated based on the reception sensitivity of a feedback response pattern transmitted by the receiving station 500.

Figure 5:
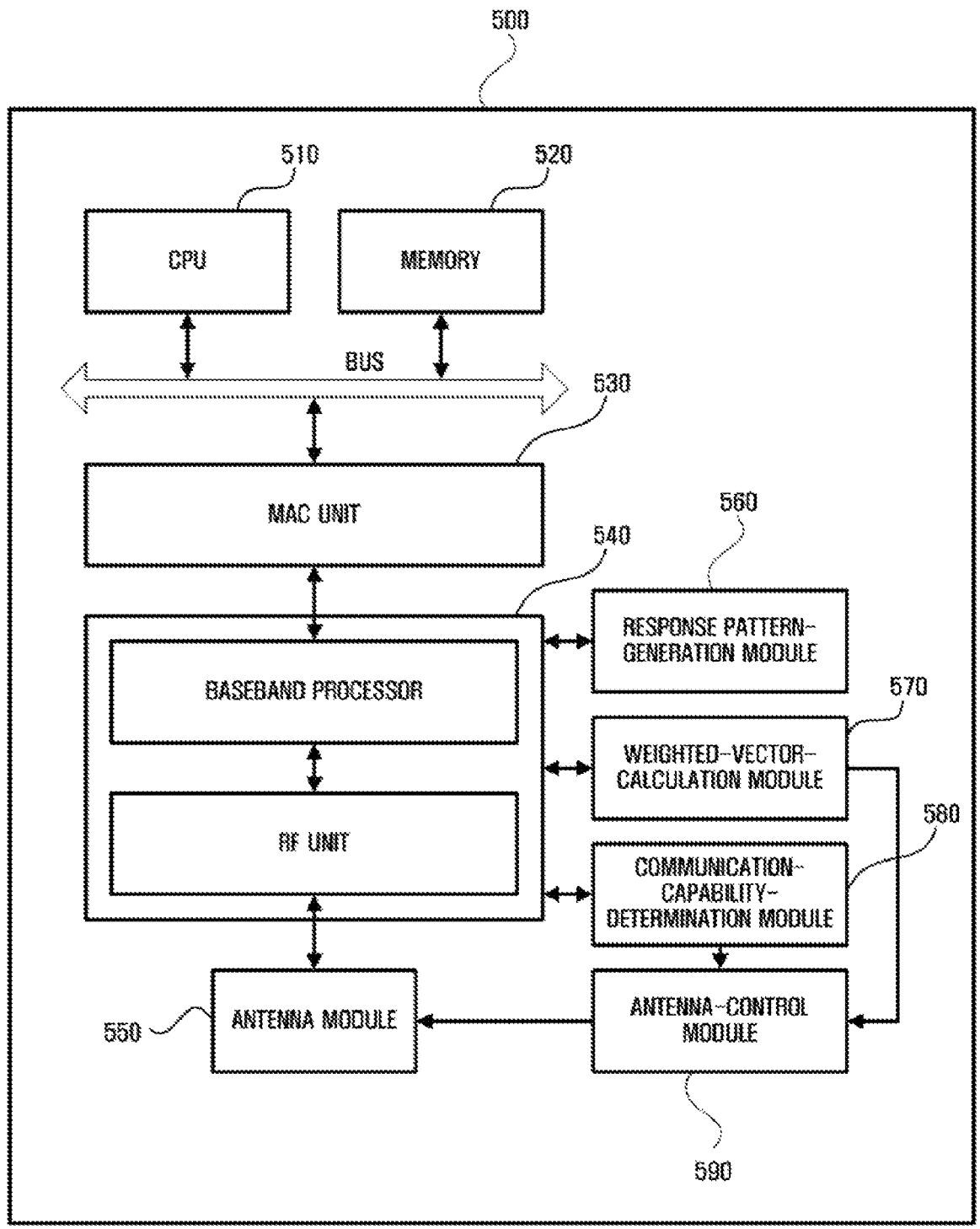
FIG. 5 illustrates a block diagram of an apparatus for receiving data according to an exemplary embodiment of the present invention.

FIG. 5 illustrates a block diagram of an apparatus for receiving data according to an exemplary embodiment of the present invention, i.e., the receiving station 500. Referring to FIG. 5, the receiving station 500 includes a CPU 510, a memory 520, an MAC unit 530, a communication module 540, an RX antenna module 550, a response pattern-generation module 560, a weighted-vector-calculation module 570, a communication-capability-determination module 580 and an antenna-control module 590.

The CPU 510, the memory 520, the MAC unit 530 and the communication module 540 perform the same functions as their respective counterparts of the transmitting station 400, and thus detailed descriptions thereof will be skipped.

The communication-capability-determination module 580 determines the communication capability of the TX antenna module 450 of the transmitting station 400 based on communication-capability data transmitted by the transmitting station 400.

The antenna-control module 590 controls the RX antenna module 550 according to a beam-forming mode determined based on the communication capability of the TX antenna module 450 and the communication capability of the RX antenna module 550.

The response pattern-generation module 560 generates a feedback response pattern in response to a TX AWV pattern transmitted by the transmitting station 400. The feedback response pattern may include information necessary for smoothly transmitting data, for example, optimum TX antenna information or an optimum TX AWV.

If the transmitting antenna module 450 includes a switch antenna, the response pattern-generation module 560 may generate a feedback response pattern specifying which of a plurality of antennas included in the TX antenna module 450 is an optimum TX antenna. That is, the response pattern-generation module 560 may specify in a feedback response pattern which of the antennas included in the TX antenna module 450 is expected to transmit data most smoothly.

If the TX antenna module 450 includes a phased-array antenna, the response pattern-generation module 560 may generate a feedback response pattern indicating an optimum antenna direction. That is, the response pattern-generation module 560 may indicate an antenna direction in which data is expected to be transmitted most smoothly, i.e., an optimum TX AWV, in a feedback response pattern.

An optimum TX AWV may be calculated by the weighted-vector-calculation module 570. An optimum TX AWV may include the offset between a current direction of the TX antenna module 450 and a desired antenna direction. The weighted-vector-calculation module 570 may calculate an optimum AWV based on the result of the analysis of a received AWV. The weighted-vector-calculation module 570 may also calculate an optimum RX AWV.

If the TX antenna module 450 includes a single antenna, the response pattern-generation module 560 may not necessarily need to generate a feedback response pattern.

The operation of the antenna-control module 590 may vary according to the type of the RX antenna module 550. Specifically, if the RX antenna module 550 includes a switch antenna, the antenna-control module 590 may select one of a plurality of antennas included in the RX antenna module 550 with reference to an RX AWV pattern transmitted by the transmitting station 400. That is, the antenna-control module 590 may select whichever of the antennas included in the RX antenna module 550 is expected to receive data most smoothly.

If the RX antenna module 550 includes a phased-array antenna, the antenna-control module 590 may control the direction of the RX antenna module 550 with reference to an RX AWV pattern transmitted by the transmitting station 400. That is, the antenna-control module 590 may calculate an antenna direction in which data is expected to be received most smoothly, i.e., an optimum RX AWV, based on an RX AWV pattern transmitted by the transmitting station 400 and then adjust the RX antenna module 550 to face the calculated antenna direction.

If the RX antenna module 550 includes a single antenna, the antenna-control module 590 may not perform any operations for beam forming.

Beam forming may be performed by repeatedly transmitting a TX AWV pattern, a feedback response pattern and an RX AWV pattern between the transmitting station 400 and the receiving station 500. If the TX antenna module 450 and the RX antenna module 550 are both single antennas, the communication capabilities of the TX antenna module 450 and the RX antenna module 550 may be determined without the need to repeatedly transmit an RX AWV pattern between the transmitting station 400 and the receiving station 500.

That is, beam forming involves synchronizing the timing, delay, and frequency/phase offset of the receiving station 500, and the timing, delay, and frequency/phase offset of the transmitting station 400, determining the communication capabilities of the receiving station 500 and the transmitting station 400 and repeatedly transmitting an AWV pattern between the receiving station 500 and the transmitting station 400. However, if the TX antenna module 450 and the RX antenna module 550 are both single antennas and thus the directions of the TX antenna module 450 and the RX antenna module 550 cannot be altered, beam forming may be terminated.

As described above, the apparatuses and methods for transmitting and receiving data according to the exemplary embodiments of the present invention have the following advantages.

First, it is possible to reduce the time required to perform beam forming by performing beam forming in consideration of the communication capabilities of antennas of stations that perform directional communication in a high-frequency band.

Second, it is possible to prevent a receiving station from performing unnecessary computation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for transmitting data using a millimeter wave channel, the apparatus comprising:
   a transmitter (TX) antenna module;
   a communication-capability-determination module which determines a communication capability of a receiver (RX) antenna module of a receiving station based on communication-capability data transmitted by the receiving station;
   an antenna-control module which controls the TX antenna module according to a beam-forming mode determined from among a plurality of beam-forming modes based on the communication capability of the RX antenna module and a communication capability of the TX antenna module; and
   a communication module which transmits data through the TX antenna module,
   wherein the beam-forming mode determines whether to transmit a TX antenna weight vector (AWV) pattern, whether to receive a feedback response pattern and whether to transmit an RX AWV pattern, and
   wherein the plurality of beam-forming modes comprises a first beam-forming mode determined when the TX antenna module includes a phased-array antenna, and a second beam-forming mode determined when the TX antenna module does not include the phased-array antenna.

2. The apparatus of claim 1, wherein:
   the communication-capability data comprises at least one of a type of the RX antenna module, a type of the TX antenna module, a number of antennas included in the RX antenna module, and a number of antennas included in the TX antenna module; and
   the beam-forming mode is determined based on the communication-capability data.

3. The apparatus of claim 1, wherein the TX antenna module has a single antenna, and the communication module performs timing and delay synchronization with the receiving station, and transmits the RX AWV pattern without transmitting the TX AWV pattern and receiving the feedback response pattern.

4. The apparatus of claim 1, wherein the antenna-control module comprises a switch antenna or the phased-array antenna, and the antenna-control module transmits the TX AWV pattern, and controls the TX antenna module based on the feedback response pattern received in response to the TX AWV pattern.

5. The apparatus of claim 4, wherein the TX antenna module comprises a switch antenna or the phased-array antenna,
   wherein when the TX antenna module comprises the switch antenna, the antenna-control module transmits an identity matrix as the TX AWV pattern and selects one of a plurality of antennas included in the TX antenna module based on the feedback response pattern received in response to the TX AWV pattern, and wherein when the TX antenna module comprises the phased-array antenna, the antenna-control module transmits a Hadamard matrix as the TX AWV pattern, and adjusts a direction of the TX antenna module based on the feedback response pattern received in the TX AWV pattern.

6. The apparatus of claim 1, wherein the TX antenna module comprises a switch antenna or the phased-array antenna, and when the RX antenna module has a single antenna, the communication module does not transmit the RX AWV pattern.

7. An apparatus for receiving data using a millimeter wave channel, the apparatus comprising:

a receiver (RX) antenna module;

a communication-capability-determination module which determines a communication capability of a transmitter (TX) antenna module of a transmitting station based on communication-capability data transmitted by the transmitting station;

an antenna-control module which controls the RX antenna module according to a beam-forming mode determined from among a plurality of beam-forming modes based on the communication capability of the TX antenna module and a communication capability of the RX antenna module; and a communication module which receives data through the RX antenna module, wherein the beam-forming mode determines whether to receive a TX antenna weight vector (AWV) pattern, whether to transmit a feedback response pattern and whether to receive an RX AWV pattern, and wherein the plurality of beam-forming modes comprises a first beam-forming mode determined when the RX antenna module includes a phased-array antenna, and a second beam-forming mode determined when the RX antenna module does not include the phased-array antenna.

8. The apparatus of claim 7, wherein, when the TX antenna module has a single antenna, the communication module performs timing and delay synchronization with the transmitting station and receives the RX AWV pattern without receiving the TX AWV pattern and transmitting the feedback response pattern.

9. The apparatus of claim 7, further comprising a response pattern-generation module which generates a feedback response pattern indicating one of a plurality of antennas included in the TX antenna module when the TX antenna module comprises a switch antenna, and generates a feedback response pattern indicating an antenna direction when the TX antenna module comprises a phased-array antenna.

10. The apparatus of claim 7, wherein the communication module receives data using a channel bandwidth of 0.5 GHz to 2.5 GHz.

11. The apparatus of claim 7, wherein the RX antenna module comprises a switch antenna or the phased-array antenna, wherein when the RX antenna module comprises the switch antenna, the antenna-control module selects one of a plurality of antennas included in the RX antenna module based on a received RX AWV pattern, and wherein when the RX antenna module comprises the phased-array antenna, the antenna-control module controls the direction of the RX antenna based on the received RX AWV pattern.

12. The apparatus of claim 7, wherein the RX antenna module has a single antenna, and when the TX antenna module comprises a switch antenna or a phased-array antenna and, the communication module does not receive the RX AWV pattern.

13. A method of transmitting data using a millimeter wave channel, the method comprising:

determining a communication capability of a receiver (RX) antenna module of a receiving station based on communication-capability data transmitted by the receiving station;

controlling a transmitter (TX) antenna module according to a beam-forming mode determined from among a plurality of beam-forming modes based on the communication capability of the RX antenna module and a communication capability of the TX antenna module; and transmitting data through the TX antenna module, wherein the beam-forming mode determines whether to transmit a TX antenna weight vector (AWV) pattern, whether to receive a feedback response pattern and whether to transmit an RX AWV pattern, and wherein the plurality of beam-forming modes comprises a first beam-forming mode determined when the TX antenna module includes a phased-array antenna, and a second beam-forming mode determined when the TX antenna module does not include the phased-array antenna.

14. The method of claim 13, wherein:

the communication-capability data comprises at least one of a type of the RX antenna module, a type of the TX antenna module, a number of antennas included in the RX antenna module, and a number of antennas included in the TX antenna module; and the beam-forming mode is determined based on the communication-capability data.

15. The method of claim 13, further comprising, when the TX antenna module has a single antenna, performing timing and delay synchronization with the receiving station and transmitting the RX AWV pattern without transmitting the TX AWV pattern and receiving the feedback response pattern.

16. The method of claim 13, further comprising, when the antenna-control module comprises a switch antenna or a phased-array antenna, transmitting the TX AWV pattern and controlling the TX antenna module based on the feedback response pattern received in response to the TX AWV pattern.

17. The method of claim 16, wherein the controlling the TX antenna module comprises:

when the TX antenna module comprises a switch antenna, transmitting an identity matrix as the TX AWV pattern and selecting one of a plurality of antennas included in the TX antenna module based on the feedback response pattern received in response to the TX AWV pattern; and when the TX antenna module comprises the phased-array antenna, transmitting a Hadamard matrix as the TX AWV pattern and adjusting a direction of the TX antenna module based on the feedback response pattern received in the TX AWV pattern.

18. The method of claim 13, wherein the controlling of the TX antenna module comprises not transmitting the RX AWV pattern when the TX antenna module comprises a switch antenna or a phased-array antenna and the RX antenna module has a single antenna.

19. A method of receiving data using a millimeter wave channel, the method comprising:
- determining a communication capability of a transmitter (TX) antenna module of a transmitting station based on communication-capability data transmitted by the transmitting station;
- controlling a receiver (RX) antenna module according to a beam-forming mode determined from among a plurality of beam-forming modes based on the communication capability of the TX antenna module and a communication capability of the RX antenna module; and
- receiving data through the RX antenna module,
- wherein the beam-forming mode determines whether to receive a TX antenna weight vector (AWV) pattern, whether to transmit a feedback response pattern and whether to receive an RX AWV pattern, and
- wherein the plurality of beam-forming modes comprises a first beam-forming mode determined when the RX antenna module includes a phased-array antenna, and a second beam-forming mode determined when the RX antenna module does not include the phased-array antenna.

20. The method of claim 19, further comprising, when the TX antenna module has a single antenna, performing timing and delay synchronization with the transmitting station and receiving the TX AWV pattern without receiving the TX AWV pattern and transmitting the feedback response pattern.

21. The method of claim 19, further comprising:
- generating a feedback response pattern indicating one of a plurality of antennas included in the TX antenna module when the TX antenna module comprises a switch antenna; and
- generating a feedback response pattern indicating an antenna direction when the TX antenna module comprises a phased-array antenna.

22. The method of claim 19, wherein the receiving of the data comprises receiving data using a channel bandwidth of 0.5 GHz to 2.5 GHz.

23. The method of claim 19, wherein the controlling the RX antenna module comprises:
- when the RX antenna module comprises a switch antenna, selecting one of a plurality of antennas included in the RX antenna module based on a received RX AWV pattern; and
- when the RX antenna module comprises the phased-array antenna, controlling the direction of the RX antenna based on the received RX AWV pattern.

24. The method of claim 19, wherein the controlling of the RX antenna module comprises not receiving the RX AWV pattern when the TX antenna module comprises a switch antenna or a phased-array antenna and the RX antenna module has a single antenna.

* * * * *